July 31, 1956

G. F. ZIFFER 2,756,934

ELECTRONIC COUNTER

Filed March 23, 1953

2 Sheets-Sheet 1

INVENTOR GARRET F. ZIFFER
BY Spencer E. Olson
ATTORNEY

July 31, 1956 G. F. ZIFFER 2,756,934
ELECTRONIC COUNTER
Filed March 23, 1953 2 Sheets-Sheet 2

| COUNT | STAGE | | |
|---|---|---|---|
| | I | II | III |
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 0 | 0 | 0 |

FIG. 2

| COUNT | STAGE | | |
|---|---|---|---|
| | I | II | III |
| 0 | 0 | 0 | 0 |
| 1 | 1 | 1 | 0 |
| 2 | 1 | 0 | 0 |
| 3 | 0 | 0 | 1 |
| 4 | 1 | 1 | 1 |
| 5 | 0 | 0 | 0 |

FIG. 3

INVENTOR GARRET F. ZIFFER
BY
Spencer E. Olson
ATTORNEY

United States Patent Office 2,756,934

Patented July 31, 1956

2,756,934

ELECTRONIC COUNTER

Garret F. Ziffer, Cambridge, Mass., assignor to Tracerlab, Inc., Boston, Mass., a corporation of Massachusetts Application March 23, 1953, Serial No. 343,831

16 Claims. (Cl. 235—92)

This invention relates to electronic counting circuits, and more particularly to a medium speed decade counter comprising a plurality of binary trigger circuits.

In the uusal electronic counter, a plurality of trigger circuits, each having two different stable conditions, are so connected in cascade that each of the trigger circuits is changed or switched from either condition to the other condition upon application to the trigger circuit of a voltage pulse of predetermined character. In binary counting circuits of this type, the trigger circuits are connected in a series chain so that upon two changes of the condition of any trigger circuit, a single output voltage pulse is supplied therefrom to the next succeeding trigger circuit in the chain to switch that next trigger circuit, whereby application of the pulses to be counted to the first trigger circuit results in an output count which is a fraction of the input count in the binary system of numerical notation.

Since the binary system is difficult to interpret and is not satisfactory for many operations, binary counters of the type described, have heretofore been modified to produce counters for use with the decimal system of notation. In the past, scale-of-ten, or decade counters, have been provided by modifying a scale-of-sixteen counter, consisting of four bistable trigger circuits connected in a series chain, but each of the modifications of the prior art of which applicant is aware, have the disadvantage of reducing the speed of operation of the counter to some extent, thus limiting the frequency of the input pulses that could be counted.

One arrangement which has been commonly used is known as the "sixteen-minus-six" circuit, and depends for its count of ten on feeding back from a later stage in the chain to an earlier one six pulses or their equivalent. To facilitate explanation of this modification, as well as the operation of the present invention, it will be helpful to adopt a certain amount of symbolism. Let "0" describe the original or "even" state of a bistable trigger circuit, and let "1" describe the "odd" state of a bistable circuit. To describe the transition from one state to another, let the two states be subscripts of the trigger circuit number, preceding the final state by the original one. Thus, the designation "$4_{10}$" means that stage 4 is switched from its "odd" to its "even" state. If a stage has no subscript, it means that it can be switched either way. Letting an arrow (→) indicate triggering, the desired result can be obtained with the "sixteen-minus-six" circuit in the two following ways:

(*a*) $1_{10}\rightarrow 2,\ 2_{10}\rightarrow 3,\ 3_{10}\rightarrow 4,\ 3_{01}\rightarrow 2_{01},\ 4_{01}\rightarrow 3_{01}$ (*b*) $1_{10}\rightarrow 2,\ 2_{10}\rightarrow 3,\ 3_{10}\rightarrow 4,\ 4_{01}\rightarrow 2_{01},\ 4_{01}\rightarrow 3_{01}$ To clarify the symbolism, method (*a*) states that as trigger circuit one goes from its "odd" to "even" state it triggers stage two; stage two in going from "odd" to "even," triggers stage three; stage three in going from "odd" to "even," triggers stage four; also, a feedback arrangement is provided between stages three and two such that a stage three goes from "even" to "odd," stage two is triggered from "even" to "odd"; and a feedback connection between stage four and stage three provides a transition of stage three from the "even" to the "odd" state as stage four goes from the "even" to the "odd" state. While counting proceeds in a straightforward manner, this arrangement has a rather serious limitation on the speed at which it can count. A particular trigger circuit, upon reception of a switching trigger, can transmit information practically instantaneously, but the completion of the switching cycle and the assumption of a state where the circuit can again be switched, takes a very finite time. For example, using method (*a*) described above, on count four, stage two is switched to its "even" state and then, at the same point in the cycle, is switched right back to the "odd" state. This double switching places a definite upper limit on the speed at which the counter can be operated, and furtherfore, the simultaneous presence of forward pulses and feedback pulses places rather stringent requirements on their relative amplitude and phasing, which makes a fast scale with its small plate and grid excursions too critical for reliable operation.

This limitation on the speed of a four stage counter has been overcome to some extent in the prior art by the simultaneous application to one of the stages of the chain pulses from others of the stages in such a way that the conductivity of said one stage is controlled by the other stages, two circuits utilizing this approach being described in U. S. Patent 2,558,936 to A. H. Dickinson and 2,620,440 to R. H. Baker et al. Fig. 6 of the Baker et al. patent and Fig. 1 of the Dickinson patent each discloses a scale-of-ten circuit comprising a quinary counter consisting of three cascaded scale-of-two circuits, either preceeded or followed by a fourth binary stage to produce a scale-of-ten. In each of the circuits, the input pulses are applied simultaneously to the first and third stages of the quinary portion of the circuit, and a feedback connection is provided between the third and first stages to control the state of conductivity of the first stage. The principle of operation of both circuits is that if in a chain of binary stages, one of the stages is exposed simultaneously to trigger pulses from others of the stages, the trigger pulse from the stage placed nearest to the end of the chain will determine whether the stage being triggered will actually change its state or not. The reason for this is that the trigger from the later stage begins before a trigger from an earlier stage can actually cause a state change in the stage being triggered while it does not end until some time after the earlier trigger pulse has disappeared. The manner in which this operates will be apparent from the following description of the quinary portion of the decade counters of the aforementioned patents. Using the symbolism formulated above, the circuits function as follows:

$$\begin{gathered}\text{Input}\rightarrow 1,\ 3_{10}\\ 1_{10}\rightarrow 2\\ 2_{10}\rightarrow 3_{01}\\ 3_{10}\rightarrow 1_{10}\end{gathered}$$

the state of each stage as the count progresses being shown in Fig. 2 of the attached drawings. It is apparent that the count progresses in a conventional manner until count four, and up to this point the input pulses have no effect on stage three since it is already in its "0" state. On count five, the input pulse resets stage three, and also tries to change stage one to its "1" or "odd" state. At the same time, however, stage three, in resetting, also applies a pulse to stage one which tends to keep stage one in the "0" or "even" condition. Because the trigger pulse from stage three occurs slightly later in time than the input pulse, it takes precedence as described above, and hence stage one will remain in the "0" or "even" condition on count five, thus making count five equivalent to count zero. As mentioned above, another binary stage, either preceding or following the quinary stage just described, provides a decade counter. It will be seen that this method is considerably faster than the sixteen-minus-six method since no stage need flip twice on the same count because of the feedback circuit. Essentially, all the feedback circuit does is to dynamically block an input trigger pulse, thus achieving the desired quinary count.

Apart from the desirability of an improvement in speed over conventional scaler circuits, it is usually desired to indicate stored count in the counter chain by means of neon lamp interpolation lights. Thus, a decade scale has ten neon lamps, each of which lights on its corresponding count. To achieve this, each neon lamp derives a voltage from several stages in the counter chain and mixes them. This mixing causes the voltage swing available per count to be attenuated in proportion to the number of stages required for this mixing. It has been found in practice, that due to the instabilities in the firing and extinction voltages of neon lamps, no more than three stages may contribute voltages to any one neon lamp and still insure reliable interpolation in a medium speed scale.

While the stored count in a "sixteen-minus-six" counter can be indicated from the voltage conditions of but three stages of the counter, the same result cannot be obtained from the higher speed circuits of Baker and Dickinson et al. described above. In a decade scale consisting of a binary scale in tandem with a quinary one, one stage that necessarily must contribute a voltage to each neon lamp is the binary scale. Therefore, to meet the criterion that voltages from but three stages contribute to the operation of any one of the interpolation lights, each count of the quinary scale must be uniquely described by any two of its three stages.

Inspection of the table of Fig. 2 immediately reveals that the prior art circuits described above do not satisfy this requirement. For example, if count zero is described by voltages derived from stages one and two, count four will produce the same voltage. If stages one and three are used, count two will duplicate it, and if stages two and three are used, count one will duplicate it. It is therefore impossible uniquely to describe every count of the prior art quinary scale with voltages derived from only two stages per count, a serious disadvantage if an indicator using ten lights is desired.

Accordingly, it is an object of the present invention to provide a scale-of-ten counter capable of operation at higher speeds than the conventional "sixteen-minus-six" counter.

Another object is to provide a scale-of-ten counter circuit using four inherently binary trigger stages capable of operation at higher speeds than a sixteen-minus-six counter, and in which the stored count may be reliably indicated with ten interpolation lights.

A further object of the present invention is to provide a decade counter using four binary stages which is capable of operation at higher speeds than the conventional "sixteen-minus-six" counter, yet uses no more components and still reliably indicates stored count by ten neon lamps, each of which is connected to but three of the four binary stages.

With the foregoing in mind, the invention is featured by four trigger circuits of the Eccles-Jordan type, one of which functions as a binary counter to divide by two the pulses to be counted, and the other three of which are connected as a quinary counter to which the output of the binary counter is applied. The quinary counter is interconnected in a novel manner whereby it provides one output pulse for each five input pulses and permits each of the five counts to be uniquely described by only two stages per count. Ten neon lamp indicator lights each of which is connected to the binary stage and to two of the stages of the quinary stage provide an indication of the count stored in the entire decade counter.

Other objects, features and advantages of the invention will become apparent from the following detailed description taken in connection with the accompanying drawings in which:

Fig. 2 is a table in which are tabulated the conditions of the various stages in two related prior art circuits, a description of which has been given above, and to which further reference will not be made; and Fig. 3 is a table in which are tabulated the conditions of the various stages in the quinary portion of the circuit of Fig. 1 during a counting operation.

Figure 1:
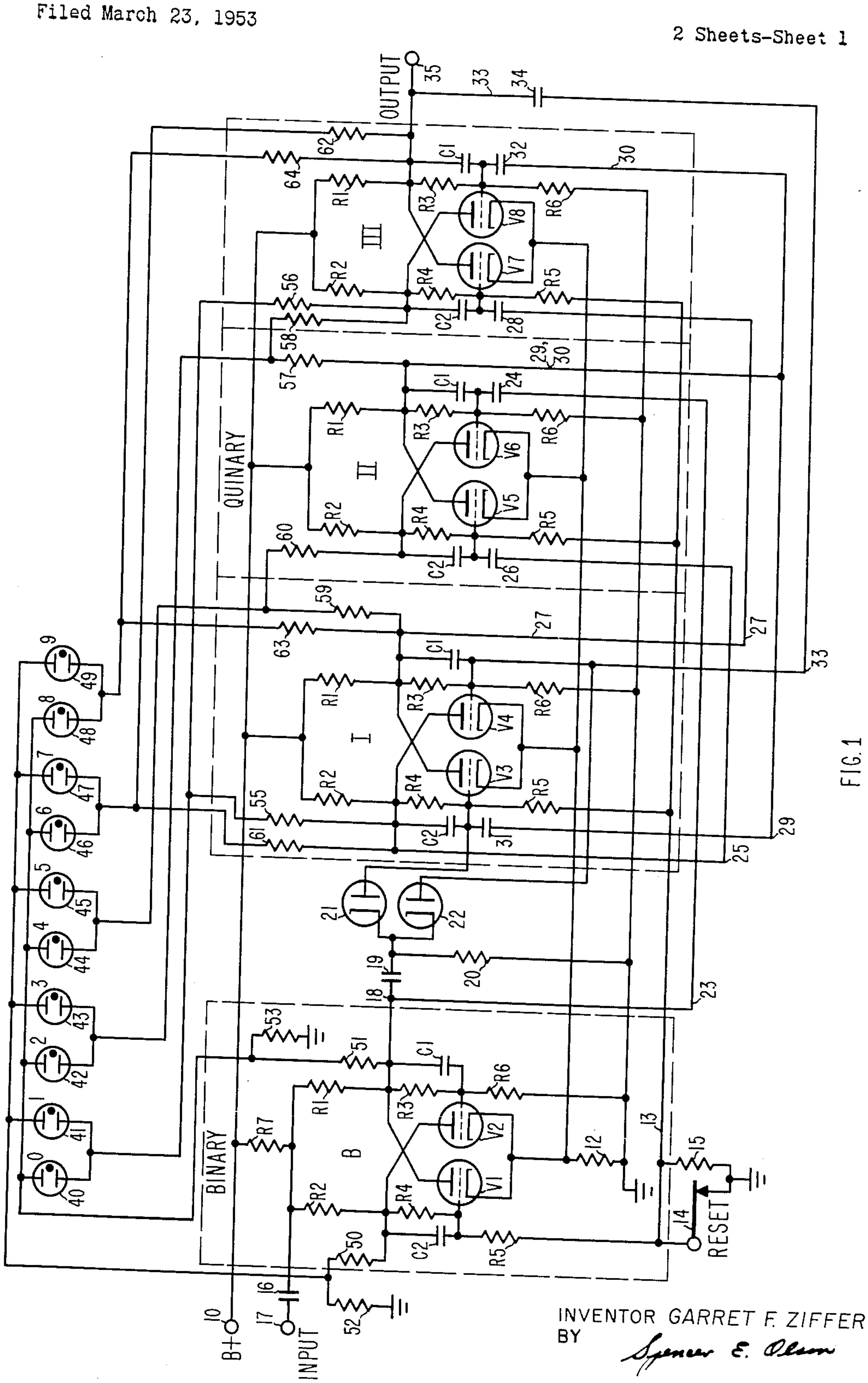
Fig. 1 is a circuit diagram illustrating one embodiment of the invention as applied to a counter for counting in the scale-of-ten.

Referring to the drawings, in Fig. 1 the counter is shown as comprising identical trigger circuits, B, I, II and III, set off for clarity, in separate broken line boxes. Each of the trigger circuits includes a twin triode comprising two triodes in a single envelope, but for purposes of the present description they are illustrated as being contained in separate envelopes. Filaments and the energizing circuits therefor which are customary with such tubes have been omitted from the diagram for clarity.

Identical elements except the tubes in the four trigger circuits B, I, II and III have the same reference characters applied thereto. For convenience in explaining the operation, the left-hand tubes are designated V1, V3, V5 and V7 and the right-hand tubes are designated V2, V4, V6 and V8. As the four trigger circuits are substantially identical, only the first trigger circuit B will be described in detail.

The anode of tube V1 is connected to the anode of tube V2 through a pair of series connected resistors R1 and R2, the junction of which is connected to positive potential terminal 10 through resistor R7. The cathodes of tubes V1 and V2 are connected through common cathode resistor 12 to ground. The anode of tube V1 is cross-connected to the control grid of tube V2 through resistor R3 in parallel with C1, and the anode of tube V2 is similarly connected to the control grid of tube V1 through resistor R4 in parallel with C2. The control grids of tubes V1 and V2 are additionally connected through resistors R5 and R6 to reset line 13 and ground, respectively. A normally closed reset switch 14 in parallel with resistor 15 is connected between the reset line and ground. Voltage impulses for switching the binary trigger stage are applied at the junction of resistors R1 and R2 via coupling condenser 16 from input terminal 17.

The operation of trigger circuits of the type described is well known and will be only briefly described. Each trigger stage has two stable conditions, alternately assumed, designated herein as the "even" and "odd" conditions. The trigger stages are considered, for purposes of the following description, as being in the "even" or "0" condition when the odd numbered tubes, i. e., V1, V3, V5 and V7 are conductive and the remaining tubes are simultaneously non-conducting, and in the "odd" or "1" condition when the odd numbered tubes are nonconducting and the remaining tubes are conducting. Reset switch 14 when momentarily opened adjusts the voltages on the grids of the two tubes of each trigger stage so that at the zero, or pre-selected starting condition, all of the triggers are in their "even" or "0" condition, with the odd numbered tubes conducting and the even numbered tubes nonconducting. The conductivity of stage B is switched from one state to the other by the simultaneous application of suitable negative pulses to the anodes of the two tubes V1 and V2, and stages I, II and III are switched from one state to the other by application of negative triggering pulses to the grids of the tubes in a manner which will be described hereinafter.

As is well known, trigger circuit B produces one output pulse for each two input pulses applied to input terminal 17, and with the arrangement of tubes described, provides a sudden decrease in potential at the anode of tube VI (point 18) with each second pulse applied. This decrease in potential is differentiated by condenser 19 and resistor 20, and the resulting negative pulses simultaneously coupled via diodes 21 and 22, to the control grids of tubes V3 and V4, respectively, of stage I of the quinary portion of the circuit. Point 18 is also coupled via connection 23 and condenser 24 to the control grid of tube V6 of stage II of the quinary portion of the circuit.

Having described the binary stage B and the manner in which division by two is accomplished, the operation of the quinary portion of the circuit will now be described considering point 18 as the input terminal for the quinary counter. Thus, the conditions of the various stages of the quinary counter will be considered for only five input pulses at point 18, the scale-of-ten being realized by virtue of the previous division by two in stage B.

In addition to the connections to the quinary counter already mentioned, the anode of tube V4 of stage I is coupled via connection 25 and condenser 26 to the control grid of tube V5 of stage II; the anode of tube V3 of stage I is coupled via connection 27 and condenser 28 to the control grid of tube V7 of stage III; the anode of tube V5 of stage II is coupled via connections 29 and 30 and condensers 31 and 32 to the control grids of tube V3 of stage I and tube V8 of stage III, respectively; and the anode of tube V7 of stage III is coupled via connection 33 and condenser 34 to the control grid of tube V4 of stage I. Each of condensers 24, 26, 28, 31, 32 and 34 are of small capacity and together with the resistor R5 or R6 associated with the grids to which it is respectively coupled differentiate the voltage changes appearing at the anode of the tube to which it is connected to produce positive and negative pulses. Only the negative pulses will tend to switch each stage since the circuit components are so selected that the positive pulses are too small to overcome the cut-off bias of a nonconducting tube. Output pulses, which are related by a factor of five to the input pulses at point 18 (and by a factor of ten to the input pulses at input terminal 17) are derived from output terminal 35.

Employing the symbolism explained earlier, the above-described connections provide the following operation of the quinary counter:

$$\text{Input (at 18)} \rightarrow 1,\ 2_{10}$$
$$1_{01} \rightarrow 2_{01}$$
$$1_{10} \rightarrow 3_{01}$$
$$2_{10} \rightarrow 1_{01},\ 3_{10}$$
$$3_{10} \rightarrow 1_{10}$$

Starting on count zero, with all stages reset, the odd numbered tubes are conducting, and accordingly are in the "even" or "0" condition. The first negative input trigger pulse on count 1 causes stage I to be switched to its "odd" state, and due to the fact that at this instant, tube V6 is nonconducting, the count one pulse coupled via connection 23 has no effect on stage II. The switching of stage I to its "odd" state simultaneously switches stage II to its "odd" state since $1_{01} \rightarrow 2_{01}$ by virtue of connection 25 and condenser 26. On count two, the input pulse tends to reset both stages I and II to the "even" state, but since $2_{10} \rightarrow 1_{01}$ by virtue of connection 29 and condenser 31, the resetting of stage II, since it occurs slightly later in time, blocks the resetting of stage I, so that following count two, stage I is still in its "odd" state. Count three does reset stage I, which in turn, by virtue of connection 27 and condenser 28, triggers stage III to its "odd" or "1" state. On count four the input pulse triggers stage I to the "odd" state, which, in turn, switches stage II to the "odd" state. On count five, the input trigger resets stage II to the "even" condition, which in turn, by virtue of connection 30 and condenser 32 resets stage III to its "even" or "0" condition. The tendency of the input trigger on count five to reset stage I to its "even" condition is blocked by stage II (connection 29 and condenser 31), but stage III takes precedence over both, since its output pulse occurs slightly later in time than the other two, and actually does reset stage I to its "even" or "0" condition by virtue of connection 33 and condenser 34. Hence, on count five, the scale is returned to its original condition with all stages in the "even" or "0" condition. The action of the counter circuit does not end when the cycle of counter operation ends, but because the binary stage and the quinary counter are in the same condition after ten counts as they are for zero count, the first pulse of the next cycle of ten pulses starts a new cycle of operation like the one just described.

The condition of each of stages I, II and III for each of the input counts is tabulated in the table of Fig. 3, examination of which will immediately indicate that each count of the scale-of-five is uniquely determinable by only two of the three stages. Zero count is determinable from stages I and III, the anode voltages of tubes V4 and V8 both being high in the "even" or "0" condition; count one is determinable from stages II and III, the anode voltage of tube V5 being high in the "odd" or "1" condition, and the anode voltage of V8 being high in the "0" condition; on count two the anode voltage of V3 of stage I is high in the "1" condition and the anode voltage of V6 of stage II is high in the "0" condition; on count three the anode voltage of V4 of stage I is high in the "0" condition and the anode voltage of V7 of stage III is high in the "1" condition; on count four the anode voltage of V3 of stage I is high in the "1" condition and the anode voltage of V7 of stage III is high in the "1" condition; and on count five the conditions for zero count are repeated. Thus, any count in the quinary counter can be described in terms of the voltage conditions in any two of the three stages, and when combined with the voltage conditions in stage B are capable of uniquely describing any count from 1 to 10.

Visual indication of the stored count in the scaler is afforded by a bank of neon lamps 40 through 49 each connected to stage B and to two stages of the quinary portion of the counter in such a way as to be lit on its corresponding input count. The ten neon lamps are numbered from zero to nine, as indicated, one electrode of each of the odd numbered tubes being connected through resistor 50 to the anode of V2 of stage B, and one electrode of each of the even numbered tubes being connected through resistor 51 to the anode of V1 of stage B. The voltages appearing at the anodes of V1 and V2 are divided before application to the neon lamps by resistors 51 and 53 and resistors 50 and 52, respectively. The other electrodes of neon lamps 40 and 41 are connected to the anode of V4 and V8 via resistors 55 and 56, respectively; lamps 42 and 43 to the anodes of V5 and V8 via resistors 57 and 58, respectively; tubes 44 and 45 to the anodes of V3 and V6 via resistors 59 and 60, respectively; tubes 46 and 47 to the anodes of V4 and V7 via resistors 61 and 62, respectively; and tubes 48 and 49 to the anodes of V3 and V7 via resistors 63 and 64, respectively.

A description of the voltage conditions in the scaler for two counts will indicate the functioning of the indicator lights. On count zero, for example, the voltage at the anode of V1 is low (stage B in "0" state) and the voltage at the anode of V4 is high (stage II in the "0" state) and the voltage at the anode of V8 is high (stage III in the "0" state). The sum of the two latter voltages exceeds the voltage contributed by the anode of V1 by more than the firing potential of the neon tubes and accordingly, neon lamp 40 lights, indicating zero count. None of the other neon lamps is fired on zero count because the voltage conditions at the other anodes to which the remaining neon tubes are connected are such on zero count that the firing potential of the neon tubes is not reached.

On count 7, stage B is switched to its odd condition, with the result that the anode of V2 is low and the potential at the anode of V1 is high. The potential at the upper electrode of neon lamp 47 is therefore low, and since stage B does not produce an output pulse in being switched from the "even" to the "odd" state, the voltage conditions in the quinary portion of the circuit are determined by count three at point 18 as tabulated in Fig. 3. The lower electrode of neon lamp 47 is connected to the anode of V4 and the anode of V7 of stages I and III, which are respectively in the "even" and "odd" conditions on count 3, and are accordingly both in the high voltage condition. The sum of these two voltages exceeds the voltage on the other electrode of neon lamp 47 by more than the firing potential of the tube, and consequently count 7 is indicated by the lighting of lamp 47.

In a typical counter constructed according to Fig. 1 and operated satisfactorily, the various components were of the following values and types:

| Tubes | Resistors | Capacitors |
|---|---|---|
| V1-V2, V3-V4, V5-V6, V7-V8 } 12AU7 | R1, R2 } 47K | C2, C3 } 50 mmf. |
| Neon Lamps 40-49—G. E. NE-2 | R3, R4 } 220K | 16—100 mmf. |
| 21-22—6AL5 | R5, R6 } 120K | 19, 24, 26, 28, 32, 34 } 10 mmf. |
| | R7—33K | 31—22 mmf. |
| | 20, 50, 51 } 100K | |
| | 52, 53 } 330K | |
| | 55-64—220K | |

While there have been shown and described and pointed out the novel features of the invention as applied to a preferred embodiment, it will be understood that various omissions and substitutions and changes in the form and operation may be made by those skilled in the art without departing from the spirit of the invention. It is the intention, therefore, to be limited only as indicated by the scope of the following claims.

What is claimed is:

1. A quinary electronic counter comprising three trigger circuits each having two conditions of stability to which it may be switched alternately by the proper application thereto of operating voltage impulses, an input connection to said trigger circuits permitting an input impulse to switch the first trigger circuit from either stable condition to the other and to switch the second trigger circuit from only one stable condition, connections between said first trigger circuit and said second and third trigger circuits causing said second trigger circuit to be switched from one stable condition to the other upon said first trigger circuit being switched from one stable condition to the other and said third trigger circuit to be switched from one stable condition to the other upon said first trigger circuit being switched from said other to said one stable condition, connections between said second trigger circuit and said first and third trigger circuits causing said first trigger circuit to be switched from one stable condition to the other and said third trigger circuit to be switched from said other to said one stable condition upon said second trigger circuit being switched from said other to said one stable condition, and a connection between said third and first trigger circuits causing said first trigger circuit to be switched from said other to said one stable condition upon said third trigger circuit being switched from said other to said one stable condition.

2. A quinary electronic counter comprising three trigger circuits each including two tubes having at least an anode, a cathode and a control grid and having two conditions of stability to which it may be switched alternately by the proper application thereto of operating voltage impulses, input connections to the control grids of both tubes of said first trigger circuit and to the control grid of one tube of said second trigger circuit permitting an input pulse to switch said first trigger circuit from either stable condition to the other and to switch said second trigger circuit from only one stable condition, first and second connections respectively between the anode of one tube of said first trigger circuit and the control grid of the other tube of said second trigger circuit and between the anode of the other tube of said first trigger circuit and the control grid of one tube of said third trigger circuit, said first and second connections permitting said second trigger circuit to be switched from the other stable condition upon said first trigger circuit being switched from one condition of stability to the other and said third trigger circuit to be switched from one stable condition to the other upon said first trigger circuit being switched from said other to said one stable condition, third and fourth connections respectively between the anode of the other tube of said second trigger circuit and the control grid of the other tube of said third trigger circuit and the control grid of said one tube of said first trigger circuit, said third and fourth connections permitting said first trigger circuit to be switched from one stable condition to the other and said third trigger circuit to be switched from said other to said one stable condition upon said second trigger circuit being switched from said other to said one stable condition, and a fifth connection between the anode of said one tube of said third trigger circuit and the control grid of said other tube of said first trigger circuit, said fifth connection permitting said first trigger circuit to be switched from said other to said one stable condition upon said third trigger circuit being switched from said other to said one stable condition.

3. A medium speed quinary counter comprising, three trigger circuits each having first and second conditions of stability to which it may be switched alternately by the proper application thereto of operating voltage impulses, an input circuit connected to said first and second trigger circuits permitting an input impulse to switch said first trigger circuit from either stable condition to the other and to switch said second trigger circuit from only said second stable condition whereby the first count of a series of five input counts switches said first trigger circuit from its first to its second stable condition, a first connection between said first and second trigger circuits permitting said second trigger circuit to be swtched from its first to its second stable condition upon said first trigger circuit being switched from its first to its second stable condition whereby upon said first count said second trigger circuit is also switched from its first to its second stable condition, a second connection from said second trigger circuit to said first trigger circuit permitting said first trigger circuit to be switched from its first to ts second stable condition upon said second trigger circuit being switched from its second to its first stable condition whereby on the second count of said series of five input pulses said second trigger circuit is switched from its second to its first stable condition and blocks the tendency of said first trigger circuit to be switched from its second to its first stable condition by said second input pulse, a third connection between said first and third trigger circuits permitting said third trigger circuit to be switched from its first to its second stable condition as said first trigger circuit is switched from its second to its first stable condition whereby on the third count of said series of five input pulses said first trigger circuit is switched to its first stable condition and said third trigger circuit is switched from its first to its second stable condition, said input circuit permtting the switching of said first trigger circuit from its first to its second stable condition in response to the fourth count of said series of five input pulses and by virtue of said first connection switches said second trigger circuit from its first to its second stable condition, and fourth and fifth connections between said second and third trigger circuits and between said third and first trigger circuits, respectively, said fourth connection permitting said third trigger circuit to be switched from its second to its first stable condition upon said second trigger circuit being switched from its second to its first stable condition and said fifth connection permitting said first trigger circuit to be switched from its second to its first stable condition upon said third trigger circuit being switched from its second to its first stable condition whereby on the fifth count of said series of five input pulses said second stage is reset to its first stable condition, which in turn, by virtue of said fourth connection, switches said third trigger circuit from its second to its first stable condition, and said third trigger circuit, in turn, by virtue of said fifth connection, switches said first trigger circuit to its first stable condition.

4. A decade electronic counter comprising the quinary circuit of claim 3 preceded by a fourth trigger circuit having two conditions of stability to which it may be switched alternately by the proper application thereto of operating voltage impulses, and with each second switching thereof, providing an operating impulse to said input circuit of said quinary counter.

5. In combination, a decade electronic counter in accordance with claim 4 and ten interpolation lights for indicating the count stored in said decade counter, each of said interpolation lights comprising a discharge device adapted to fire upon application of a predetermined voltage thereacross, means connecting one terminal of each of said discharge devices to said fourth trigger circuit, and means connecting the other terminal of each of said discharge devices to two trigger circuits of said quinary electronic counter.

6. A bi-quinary electronic counter comprising a group of four trigger circuits each having first and second conditions of stability to which it may be switched alternately by the proper application thereto of operating voltage impulses and each including first and second electron tubes each having at least an anode, a cathode and a control grid, said first trigger circuit with each second switching thereof providing an operating impulse at the anode of its first tube, means connecting the anode of the first tube of said first trigger circuit to the control grids of the first and second tubes of said second trigger circuit and to the control grid of the second tube of said third trigger circuit, a first connection between the anode of the second tube of said second trigger circuit and the control grid of the first tube of said third trigger circuit, a second connection between the anode of the first tube of said second trigger circuit and the control grid of the first tube of said fourth trigger circuit, a third connection between the anode of the first tube of said third trigger circuit and the control grid of the first tube of said second trigger circuit, a fourth connection between the anode of the first tube of said third trigger circuit and the control grid of the second tube of said fourth trigger circuit, and a fifth connection between the anode of the first tube of said fourth trigger circuit and the control grid of the second tube of said second trigger circuit, said connections each including a capacitor and cooperating to provide a sequence of switching of said second, third and fourth trigger circuits such that upon application of ten input pulses to said first trigger circuit, a single output pulse is provided at the anode of the first tube of said fourth trigger circuit and any count is uniquely describable by the condition of stability of said first trigger circuit and of only two of the remaining three trigger circuits.

7. A circuit in accordance with claim 6 and a count interpolation circuit therefor comprising ten neon lamps having a predetermined breakdown potential and respectively designated 0 to 9, means resistively coupling one electrode of each of the odd numbered neon lamps to the anode of the second tube of said first trigger circuit, means resistively coupling one electrode of each of the even numbered neon lamps to the anode of the first tube of said first trigger circuit, means resistively connecting the other electrode of the 0 and 1 neon lamps to the anodes of the second tube of each of said second and fourth trigger circuits, means resistively connecting the other electrode of the 2 and 3 neon lamps to the anode of the first tube of said third trigger circuit and the anode of the second tube of said fourth trigger circuit, means resistively connecting the other electrode of the 4 and 5 neon lamps to the anode of the first tube of said second trigger circuit and the anode of the second tube of said third trigger circuit, means resistively connecting the other electrode of the 6 and 7 neon lamps to the anode of the second tube of said second trigger circuit and to the anode of the first tube of said fourth trigger circuit, and means resistively connecting the other electrode of the 8 and 9 neon lamps to the anode of the first tube of said second trigger circuit and the anode of the first tube of said fourth trigger circuit.

8. A decade counter comprising four trigger circuits each having first and second stable conditions to which it may be switched alternately by the proper application thereto of operating voltage impulses, said first trigger circuit with each second switching thereof providing an operating impulse, connections from said first trigger circuit to said second and third trigger circuits for coupling an operating voltage impulse from said first trigger circuit to switch said second trigger circuit from either stable condition and to switch said third trigger circuit from only one stable condition, connections between said second trigger circuit and said third and fourth trigger circuits causing said third trigger circuit to be switched from one stable condition to the other upon said second trigger circuit being switched from one stable condition to the other and said fourth trigger circuit to be switched from one stable condition to the other upon said second trigger circuit being switched from said other to said one stable condition, connections between said third trigger circuit and said second and fourth trigger circuits causing said second trigger circuit to be switched from one stable condition to the other and said fourth trigger circuit to be switched from said other to said one stable condition upon said third trigger circuit being switched from said other to said one stable condition, and a connection between said fourth and second trigger circuits causing said second trigger circuit to be switched from said other to said one stable condition upon said fourth trigger circuit being switched from said other to said one stable condition.

9. A counter circuit comprising first, second, third and fourth trigger circuits each having two stable conditions and each including a pair of electron tubes having anode, cathode and control grid electrodes, said first trigger circuit providing an output pulse at a first anode thereof upon each second switching thereof, means connected between said first anode of said first trigger circuit and said second trigger circuit arranged whereby an output pulse from said first trigger circuit causes switching of said second trigger circuit from either stable condition, means connected between said first anode of said first trigger circuit and one grid of said third trigger circuit, means connected between one anode of said second trigger circuit and the other control grid of said third trigger circuit, means connected between the other anode of said second trigger circuit and one control grid of said fourth trigger circuit, means connected between one anode of said third trigger circuit and the other control grid of said fourth trigger circuit and one control grid of said second trigger circuit, and means connected between one anode of said fourth trigger circuit and the other control grid of said second trigger circuit, said connecting means being such that one pulse is delivered at said one anode of said fourth trigger circuit in response to ten pulses applied to said first trigger circuit.

10. A counter circuit comprising first, second, third and fourth trigger circuits each including a pair of electron tubes having anode, cathode and control grid electrodes, said first trigger circuit providing an output pulse at a first anode thereof upon each second switching thereof, means connected between said first anode of said first trigger circuit and both control grids of said second trigger circuit and one control grid of said third trigger circuit, means connected between one anode of said second trigger circuit and the other control grid of said third trigger circuit, means connected between the other anode of said second trigger circuit and one control grid of said fourth trigger circuit, means connected between one anode of said third trigger circuit and the other control grid of said fourth trigger circuit and one control grid of said second trigger circuit, and means connected between one anode of said fourth trigger circuit and the other control grid of said second trigger circuit, said connections being such that one pulse is delivered at the said one anode of said fourth trigger circuit in response to ten pulses applied to said first trigger circuit.

11. A quinary counter comprising a group of three trigger circuits each having first and second stable conditions to which it may be switched alternately by the proper application thereto of operating voltage impulses, an input connection to said trigger circuits permitting an input pulse to switch the first trigger circuit from either stable condition to the other and the second trigger circuit from only one stable condition, separate means connected between said first trigger circuit and said second and third trigger circuits arranged to couple an operating pulse to said second trigger circuit upon each switching of said first trigger circuit from one stable condition and to couple an operating pulse to said third trigger circuit upon each switching of said first trigger circuit from its other stable condition, means connected between said second trigger circuit and said first and third trigger circuits arranged to couple an operating pulse to each of said first and third trigger circuits upon each switching of said second trigger circuit from one stable condition, and means connected between said third and first trigger circuits arranged to couple an operating impulse to said first trigger circuit upon each switching of said third trigger circuit from one stable condition, said connecting means causing a sequence of switching of said trigger circuits such that one output pulse is generated by said third trigger circuit in response to five input pulses applied to said input circuit and any input count is uniquely described by the condition of stability of two of said three trigger circuits.

12. A quinary electronic counter comprising a group of three trigger circuits each having two conditions of stability to which it may be switched alternately by the proper application thereto of operating voltage impulses, an input circuit connected to said first and second trigger circuits for applying input voltage impulses thereto, means for coupling operating voltage impulses from said first trigger circuit to said second and third trigger circuits, means for coupling operating voltage impulses from said second trigger circuit to said first and third trigger circuits, and means for coupling operating voltage impulses from said third trigger circuit to said first trigger circuit, said coupling means being arranged whereby certain of the operating voltage impulses applied to a trigger circuit are mutually canceled and prevent a change in its stable condition and other of the operating impulses applied to a trigger circuit are not canceled and produce a change in its stable condition and cause a sequence of switching of said trigger circuits such that one output pulse is generated by said third trigger circuit in response to five input voltage pulses and any input count is uniquely described by the condition of stability of two of said trigger circuits.

13. A quinary electronic counter comprising a group of three trigger circuits each having two conditions of stability, the first of said trigger circuits being arranged to generate an operating voltage impulse upon each switching thereof and the second and third of said trigger circuits being arranged each to generate an operating voltage impulse upon each second switching thereof, an input circuit connected to the first and second of said trigger circuits for applying input voltage impulses thereto, and means interconnecting said first, second and third trigger circuits for coupling operating voltage impulses therebetween arranged to cause a sequence of switching of said trigger circuits such that one output pulse is generated by said third trigger circuit in response to five input voltage impulses and any input count is uniquely described by the condition of stability of two of said three trigger circuits.

14. A quinary electronic counter comprising first, second and third trigger circuits each having two conditions of stability to which it may be switched alternately by proper application thereto of operating voltage impulses, said first trigger circuit being arranged to generate an operating voltage impulse upon switching from either condition of stability and said second and third trigger circuits each being arranged to generate an operating voltage impulse only upon switching from one stable condition, an input circuit connected to said first and second trigger circuits for applying input voltage impulses thereto, and means interconnecting said trigger circuits for coupling operating voltage impulses therebetween arranged to cause a sequence of switching of said trigger circuits such that one output pulse is generated by said third trigger circuit in response to five input voltage impulses and any input pulse is uniquely described by the condition of stability of two of said three trigger circuits.

15. A decade counter comprising four trigger circuits each having two conditions of stability, the second of said trigger circuits being arranged to generate an operating voltage impulse upon each switching thereof and the first, third and fourth of said trigger circuits being arranged each to generate an operating voltage impulse upon each second switching thereof, an input circuit connected to the first of said trigger circuits for applying input voltage impulses thereto, connections between said first trigger circuit and the second and third of said trigger circuits for applying operating voltage impulses from said first trigger circuit thereto, and means interconnecting said second, third and fourth trigger circuits for coupling operating voltage impulses therebetween arranged to cause a sequence of switching of said second, third and fourth trigger circuits such that one output pulse is generated by said fourth trigger circuit in response to five operating voltage impulses from said first trigger circuit and the count of any of said five impulses is uniquely described by the condition of stability of two of the last three of said trigger circuits.

16. In combination, a decade counter in accordance with claim 15 and ten interpolation lights for indicating the count stored in said counter, each of said interpolation lights comprising a discharge device adapted to fire upon application of a predetermined voltage thereacross, means connecting one terminal of each of said discharge devices to said first trigger circuit, and means connecting the other terminal of each of said discharge devices to two of the last three trigger circuits of said counter.

References Cited in the file of this patent

UNITED STATES PATENTS

| | | |
|---|---|---|
| 2,521,788 | Grosdoff | Sept. 12, 1950 |
| 2,620,440 | Baker | Dec. 2, 1952 |

OTHER REFERENCES

Electronic Digital Counters, Bliss; Electrical Engineering, April 1949; pages 309 to 313; Figure 3.

Gated Lamp Decade Counters, Rod; Electronics; October 1952; pages 170–172; Figure 1.